(12) United States Patent
Sterling et al.

(10) Patent No.: US 11,833,941 B2
(45) Date of Patent: Dec. 5, 2023

(54) VEHICLE LOAD FLOOR ADJUSTMENT SYSTEM

(71) Applicant: Rivian IP Holdings, LLC, Plymouth, MI (US)

(72) Inventors: Jennifer Sterling, Commerce Charter Township, MI (US); Marcus Merideth, Westland, MI (US); John Behrendt, Ann Arbor, MI (US); Peter McKean, Rochester Hills, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 359 days.

(21) Appl. No.: 17/166,913

(22) Filed: Feb. 3, 2021

(65) Prior Publication Data
US 2022/0242283 A1 Aug. 4, 2022

(51) Int. Cl.
*B60N 2/30* (2006.01)
*B60N 2/68* (2006.01)

(52) U.S. Cl.
CPC .......... *B60N 2/3065* (2013.01); *B60N 2/309* (2013.01); *B60N 2/686* (2013.01); *B60N 2/3013* (2013.01)

(58) Field of Classification Search
CPC .. B60N 2/3065; B60N 2/36; B60N 2002/363; B60N 2/309; B60N 2/686; B60N 2/3013; B60R 5/04
USPC ........................... 296/65.01, 65.16, 37.16, 69
See application file for complete search history.

(56) References Cited

U.S. PATENT DOCUMENTS

| | | | | |
|---|---|---|---|---|
| 2011/0095571 A1* | 4/2011 | Maguire | ................ | B60N 2/065 296/64 |
| 2011/0133508 A1* | 6/2011 | Zuelch | .................... | B60R 5/006 296/65.16 |
| 2016/0059788 A1* | 3/2016 | Lu | ........................... | B60R 5/045 296/37.16 |
| 2018/0215327 A1* | 8/2018 | Patrick | .................. | B60R 13/011 |

FOREIGN PATENT DOCUMENTS

| | | | | |
|---|---|---|---|---|
| DE | 19944622 B4 * | 7/2004 | ........... | B60N 2/3013 |
| DE | 102013012604 A1 * | 1/2015 | ............... | B60N 2/23 |
| EP | 1256488 A1 * | 11/2002 | ........... | B60N 2/3013 |
| EP | 1849650 A1 * | 10/2007 | ........... | B60N 2/3009 |

(Continued)

OTHER PUBLICATIONS

Youtube Video: 5 Insane Features of the Rolls Royce Cullian, URL: https://www.youtube.com/watch?v=03hSFuSobjA, Dated Oct. 12, 2018, Accessed Aug. 11, 2023.

*Primary Examiner* — Amy R Weisberg
*Assistant Examiner* — Kevin P Weldon
(74) *Attorney, Agent, or Firm* — Haley Guiliano LLP (57) ABSTRACT

Mechanisms for raising at least a portion of a vehicle load floor in response to lowering of one adjacent seat, to allow for easier loading of vehicle cargo areas. Mechanisms may raise a portion of the load floor when any one or more adjacent seats are lowered, but only lower the load floor when all adjacent seats are raised. In this manner, mechanisms of embodiments of the disclosure raise the load floor to an inclined position so that the load floor gradually rises to the elevation of any adjacent folded seat backs, rather than having a step increase in height at the boundary between load floor and seats. This allows for easier sliding of cargo over the load floor and onto the seat backs.

20 Claims, 7 Drawing Sheets

(56) References Cited

FOREIGN PATENT DOCUMENTS

| | | | | | |
|---|---|---|---|---|---|
| GB | 2410223 | A | * | 7/2005 | ............... B60R 5/04 |
| GB | 2520804 | A | * | 6/2015 | ............. B60R 5/044 |
| WO | WO-2013079835 | A1 | * | 6/2013 | ............... B60R 5/04 |

* cited by examiner

VEHICLE LOAD FLOOR ADJUSTMENT SYSTEM

INTRODUCTION

The present disclosure is directed to load floors. More specifically, the present disclosure is directed to vehicle load floor adjustment systems.

SUMMARY

Vehicles are often constructed with cargo compartments or areas such as trunks, which provide storage space. These compartments are typically constructed as open volumes with a flat and rigid load floor that can support the weight of various stored items. Often, however, flat load floors present certain drawbacks. For example, certain vehicle designs allow for adjacent seats to be folded down for additional storage space. When folded down though, portions of the seats are often raised relative to the load floor, thus presenting a step that impedes the ability to slide cargo along the load floor onto the seat back.

Accordingly, systems and methods are disclosed herein for a mechanical load floor adjustment mechanism that raises and lowers the load floor according to seat movement. The mechanism has a rotatable element coupled to a linkage that raises the portion of the load floor nearest the seats. When seats are raised or lowered, the seat back is pivoted about an axis that lies typically between the seat back and seat rest. This rotational motion drives the rotatable element, which in turn moves the linkage to raise or incline a portion of the load floor to the same or similar elevation as the folded seat back. Similarly, raising the seat back lowers the load floor back to its original horizontal configuration.

In some embodiments of the disclosure, the rotatable element may be positioned near the rotational axis between the seat back and seat rest, so that the seat back engages the rotatable element and rotates it when the seat back is raised or lowered. The linkage is coupled between the rotatable element and a portion of the load floor. In this manner, the linkage converts rotational motion of the rotatable element to linear vertical translation of part of the load floor, thus raising or lowering the load floor when the element is rotated, i.e., when the seat back is raised or lowered. This mechanical assembly thus raises the load floor to a raised, inclined, or elevated configuration when the seat back is lowered, and lowers the load floor back to its lowered or horizontal configuration when the seat back is raised.

The mechanism of embodiments of the disclosure may also be positioned to engage multiple seats, rather than just one. More specifically, the rotatable element may be positioned between two adjacent seats, such as two rear seats, near their rotational axes between their seat backs and seat rests. In this manner, the mechanism may act to raise the load floor when either seat is lowered, and may also lower the load floor only when both seats are raised. That is, the mechanism of embodiments of the disclosure may be configured to raise the load floor when either one of the adjacent seats is lowered, and to lower the load floor only when both (or all) seats are raised. The mechanism would maintain the load floor in its elevated or inclined configuration whenever less than all of its seats are raised. In this manner, the mechanism maintains the load floor in its elevated or inclined configuration whenever any adjacent seat is lowered, allowing for easier loading of the cargo area without need for lowering both seats.

In some embodiments of the disclosure, this is accomplished via a rotatable element with a body and two protrusions or extensions extending from the body at different circumferential locations. One element is circumferentially positioned such that a portion of the seat engages one protrusion when the seat is lowered, rotating the element and raising the load floor. Similarly, the other element is circumferentially positioned such that a portion of the seat engages it when the seat is raised, rotating the element to lower the load floor.

In some embodiments of the disclosure, both of the above-described protrusions extend from the same side of the rotatable element, and two additional protrusions extend from the opposite side of the rotatable element, also at two different circumferential locations. These two additional extensions are configured so that rotation of a second seat's axis may engage the rotational element and raise the load floor if it has not already been raised, and lower the load floor only if both seats are raised. To accomplish this, one extension of each side of the rotatable element may include a pivotable element with one end that can be pivoted to engage the seat it faces, and another end extending toward the opposing seat. In this configuration, engagement by the opposing seat pivots the element away from engagement with the seat it faces, so that the seat it faces cannot lower the load floor if the opposing seat is already lowered. In this manner, mechanisms of embodiments of the disclosure keep the load floor raised if one seat is raised and the other lowered, and only lower the load floor when both seats are raised.

Mechanisms of embodiments of the disclosure may raise load floors into any position or orientation. In some embodiments of the disclosure, the linkage may act against a portion of the load floor nearest to its adjacent seats, so that the linkage raises the load floor to an inclined configuration with the end closest to the seats raised with respect to the opposite end (e.g., the end closer to the rear of the vehicle).

In this configuration, the raised end of the load floor may be lifted to any elevation. For example, the end of the load floor nearest the adjacent seats may be raised to an elevation matching the elevation of the adjacent seat backs when those seats are lowered.

Mechanisms of embodiments of the disclosure may further contain other elements as desired. For example, one or more load limiter springs may be coupled between the seats and the rotatable element to allow the seats to be lowered when, e.g., an excessive load prevents raising of the load floor. Such load limiter springs may also prevent damage to the mechanism from such excessive loads.

The linkages of embodiments of the disclosure may be any linkages capable of raising and lowering a load floor in response to a rotatable element such as described herein. An exemplary linkage may be a two-bar linkage with one bar rotatably coupled to the rotatable element and the other bar coupled to the load floor, such as via a roller that is in rolling frictional contact with the load floor. The second bar may extend beyond the vertical when the load floor is raised, e.g., may form an acute included angle with the first bar, to assist in maintaining the load floor in the elevated position.

Embodiments of the disclosure may thus provide an assembly that adjusts vehicle load floors according to movement of vehicle seats, where the assembly includes a linkage coupled between the load floor and the vehicle seats. The linkage raises a portion of the load floor in response to lowering of one or more of the seats, and keeps the load floor raised so long as at least one of the seats is lowered. The linkage acts to lower the portion of the load floor only in response to raising of every seat to which it is coupled.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to a mechanism that raises at least a portion of a vehicle load floor in response to lowering of one adjacent seat, to allow for easier loading of vehicle cargo areas. The mechanism raises a portion of the load floor when any one or more adjacent seats are lowered, but only lowers the load floor when all adjacent seats are raised. In this manner, mechanisms of embodiments of the disclosure raise the load floor to an inclined position so that the load floor gradually rises to the elevation of any adjacent folded seat backs, rather than having a step increase in height at the boundary between load floor and seats. This allows for easier sliding of cargo over the load floor and onto the seat backs.

Figure 1:
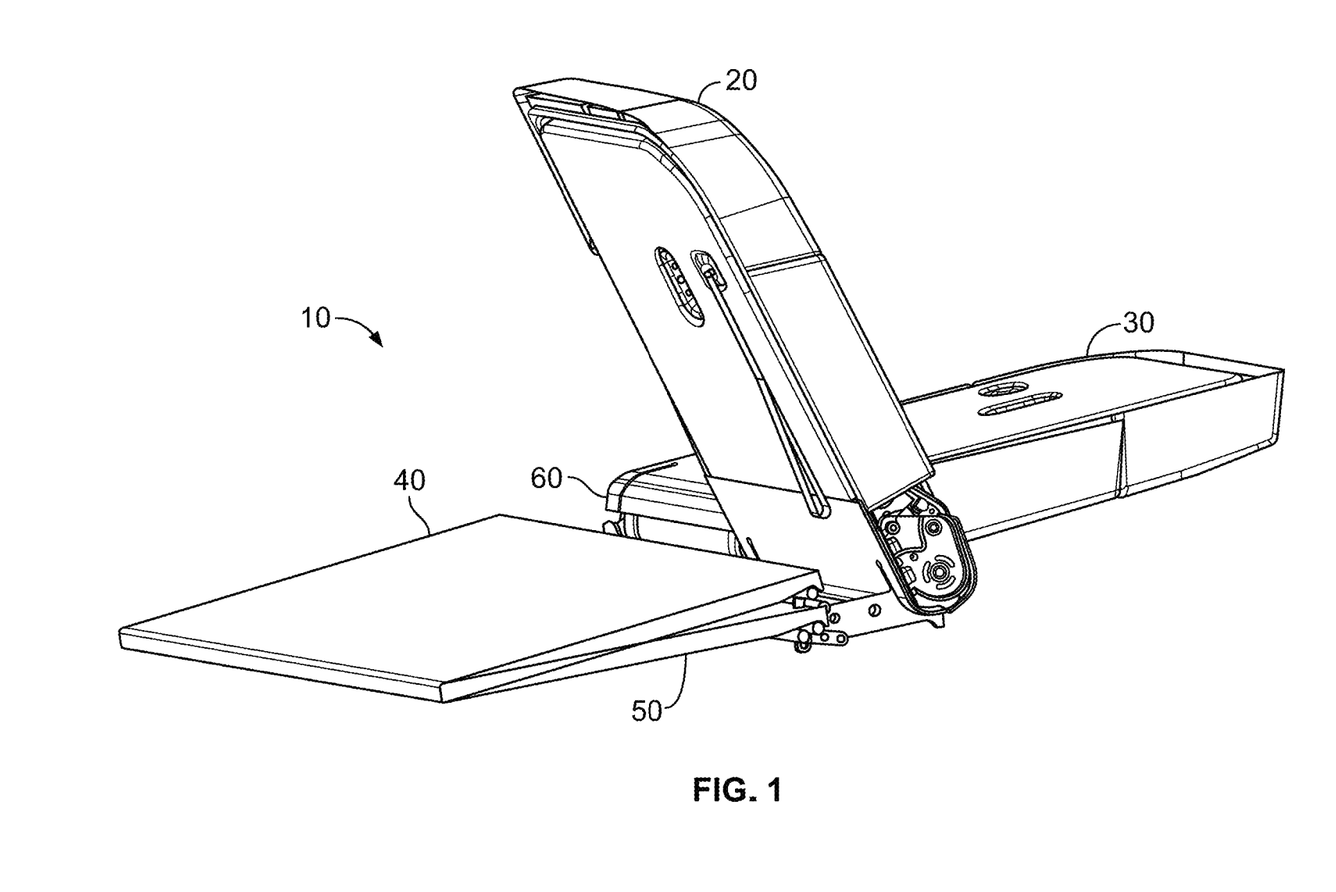
FIG. 1 is an isometric view of an exemplary system for adjusting a vehicle load floor according to seat position, constructed in accordance some with embodiments of the disclosure.

FIG. 1 is an isometric view of an exemplary system for adjusting a vehicle load floor according to seat position, constructed in accordance some with embodiments of the disclosure. FIG. 1 is a superposition of two different configurations of a vehicle load floor system, with one configuration being a raised load floor which has been raised by a lowering of one seat, and another configuration being a lowered load floor which is lowered when both seats are raised. Here, a vehicle load floor system 10 includes a pair of seats 20, 30 coupled to a load floor such that raising and lowering the seats acts to adjust a height of the load floor. More specifically, lowering either of seats 20, 30 raises the load floor to a raised load floor configuration 40, while raising both seats 20, 30 returns the load floor to a lowered load floor configuration 50. Thus, the load floor is raised to a raised load floor configuration 40 which is inclined to provide a gradual increase in height from a lower portion of the load floor to an elevation similar to that of end 60 of seat 30. Accordingly, unlike vehicles that have a step-increase in height between load floor and adjacent seats when folded, embodiments of the disclosure provide a mechanism that inclines the load floor to correspond to the height of adjacent folded seats, sloping upwards to meet folded seats. In this manner, objects may be more easily slid across the load floor onto the backs of folded seats 20, 30, providing for easier loading of the vehicle.

The load floor can be raised from its lowered load floor configuration 50, e.g., a flat trunk bed, to its raised load floor configuration 40, where the elevation of the upper end of the raised load floor configuration 40 may be of any elevation. Thus, while the raised end of raised load floor configuration 40 is described in some embodiments of the disclosure as having a height approximately the same as the height of the upper surface of lowered seat 30, any height is contemplated.

Figure 2A:
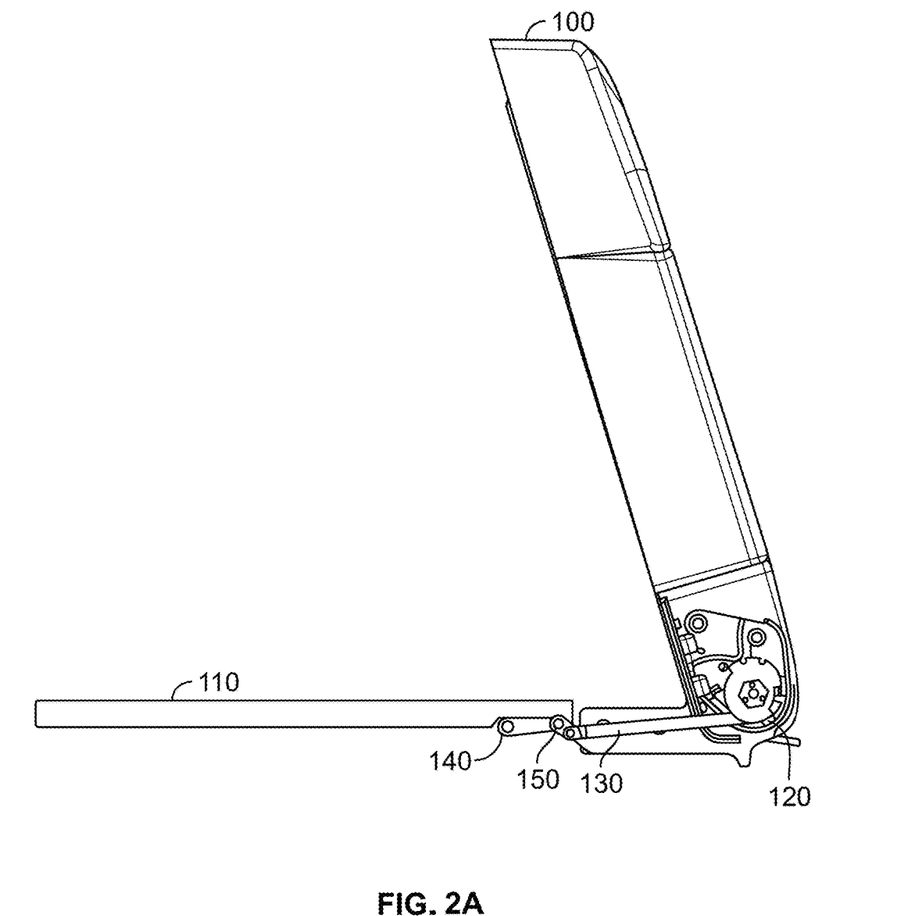
FIG. 2A is a side view of the system of FIG. 1 in a raised seat configuration, in accordance with some embodiments of the disclosure.

The operation of mechanisms of embodiments of the disclosure is further described in connection with FIGS. 2A-2B. FIG. 2A is a side view of the system of FIG. 1 in a raised seat configuration, in accordance with some embodiments of the disclosure. In one configuration, a vehicle seat 100 is in its raised position, for accommodating passengers. Accordingly, the load floor 110 of the vehicle's cargo area is in a horizontal or lowered configuration that provides a flat surface for accommodating items which passengers may wish to store. A mechanism is coupled between the seat 100 and load floor 110, where this mechanism includes a rotatable element 120 for engagement with seat 100, a first arm 130, second arm 140, and a pivot point 150. One end of first arm 130 is pivotably coupled to rotatable element 120 and the opposing end of first arm 130 is pivotably connected to second arm 140. One end of second arm 140 is thus pivotably connected to second arm 140, while the opposite end of second arm 140 is in frictional contact with the lower surface of load floor 110 as shown. The second arm 140 is thus configured to pivot about pivot point 150 according to motion of the first arm 130.

Figure 2B:
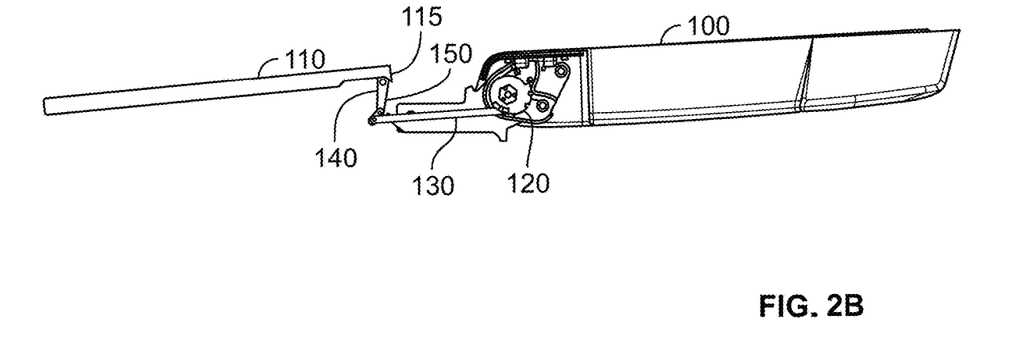
FIG. 2B is a side view of the system of FIG. 1 in a lowered seat configuration, in accordance with some embodiments of the disclosure.

FIG. 2B is a side view of the system of FIG. 1 in a lowered seat configuration, in accordance with some embodiments of the disclosure. As above, lowering the seat 100 acts to raise load floor 110 to an inclined configuration, so that the load floor 110 slopes upward to a height at least approximating that of the upper surface of seat 100. When seat 100 is folded down or lowered as in FIG. 2B, the rotation of seat 100 engages and rotates rotatable element 120 in a clockwise direction. This clockwise rotational motion is converted to rearward or leftward translational motion of first arm 130 in the view of FIG. 2B. This in turn pivots second arm 140 about pivot point 150, raising the opposing end of second arm 140 and thereby raising an end of load floor 110. In some embodiments of the disclosure, the second arm 140 may extend past vertical when fully raised, as can be seen in FIG. 2B. That is, the included angle between first arm 130 and the portion of second arm 140 that frictionally contacts load floor 110 may be an acute angle. The weight of load floor 110 and any overlying stored goods may thus act to press the second arm 140 against the lip 115 of load floor 110, which may help to maintain the load floor 110 more securely in its raised configuration.

Raising seat 100 may generally perform the reverse process, rotating the rotatable element 120 in a counter-clockwise direction which is converted to forward or rightward translational motion of first arm or bar 130 in the view of FIG. 2B. This acts to pivot second arm 140 counterclockwise about pivot point 150, lowering the opposing end of second arm or bar 140 and thus lowering the load floor 110 back to the horizontal configuration of FIG. 2A. In this manner, folding seat 100 downward may raise an end of the load floor 110, providing an inclined surface that allows the load floor 110 to gradually rise to the elevation of the upper surface of folded seat 100, instead of generating a step increase in elevation that may make loading and unloading of the vehicle more difficult.

Figure 3:
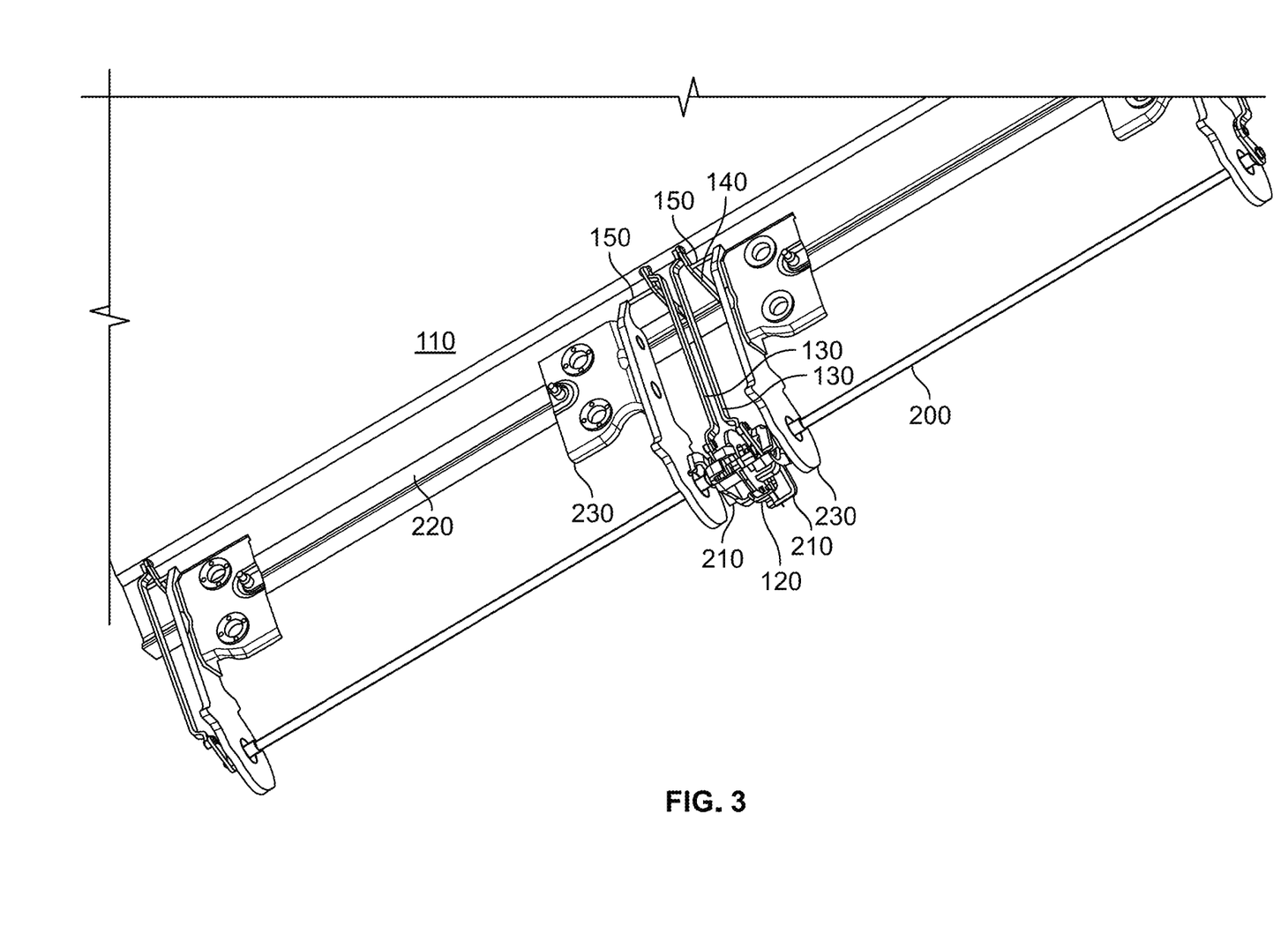
FIG. 3 is an isometric bottom view illustrating further details of a load floor adjustment mechanism, constructed in accordance with some embodiments of the disclosure.

While one seat is shown in FIGS. 2A-2B, embodiments of the disclosure contemplate the raising and lowering of load floor 110 according to motion of multiple different seats. In particular, the mechanism of FIGS. 2A-2B may be coupled to more than one seat 100, to raise and lower the load floor according to the folding and unfolding of multiple seats 100. FIG. 3 is an isometric bottom view illustrating further details of a load floor adjustment mechanism, constructed in accordance with some embodiments of the disclosure, which raises and lowers load floor 110 according to motion of two different seats 100. More specifically, two seats 100 (not shown) may be arranged side by side, such as with tandem rear seats of a vehicle. A rod 200 may extend through the points about which each seat 100 pivots when raised or lowered, and rotatable element 120 may be rotatably affixed to the rod 200 between the two seats 100. Each seat 100 may have brackets 230 connecting the seat 100 to the vehicle as well as providing pivot point 150. Extensions 210 of each seat 100 are connected to seats 100 to rotate about rod 200 when their seats 100 are folded or unfolded. In some embodiments, rod 200 may not rotate, and thus folding and unfolding of seats 100 rotates extensions 210 to engage portions of the rotatable element 120, turning element 120 as the seats 100 are lowered or raised, thereby raising or lowering load floor 110 as above. One or more rollers 220 may be connected to the ends of second arms 140 and placed in rolling frictional contact with the underside of load floor 110, so that movement of second arms 140 raises and lowers load floor 110 via rolling contact with rollers 220.

It is further observed that each seat 100 may actuate its own section of load floor 110. That is, with reference to FIGS. 2A-2B, a separate load floor 110 section may be present for each seat 100, and each seat 100 may raise or lower its own section of load floor 110. In some embodiments of the disclosure, this may be accomplished via a separate load floor adjustment mechanism, such as that shown in FIGS. 2A-2B, coupled to each seat 100 and configured to adjust its own section of load floor 110. Each load floor 110 section or segment may be positioned behind its seat 100, as shown.

Figure 4A:
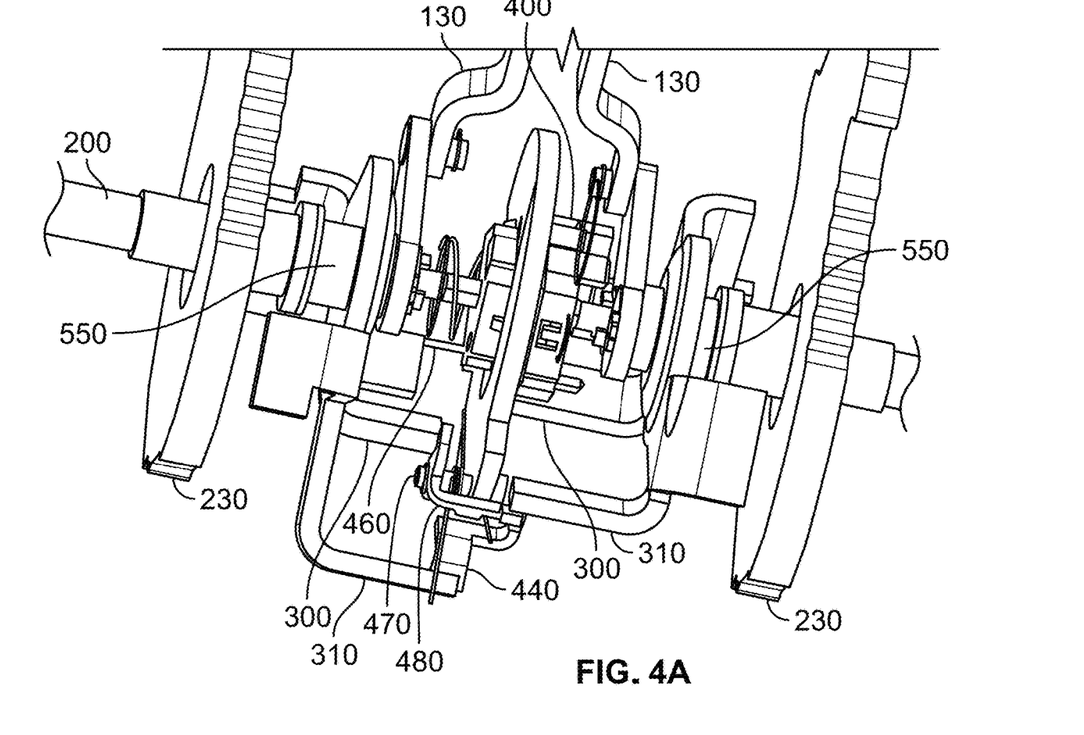
FIGS. 4A-4B are more detailed isometric views illustrating further details of a rotatable element of a load floor adjustment mechanism, constructed in accordance with some embodiments of the disclosure.
Figure 4B:
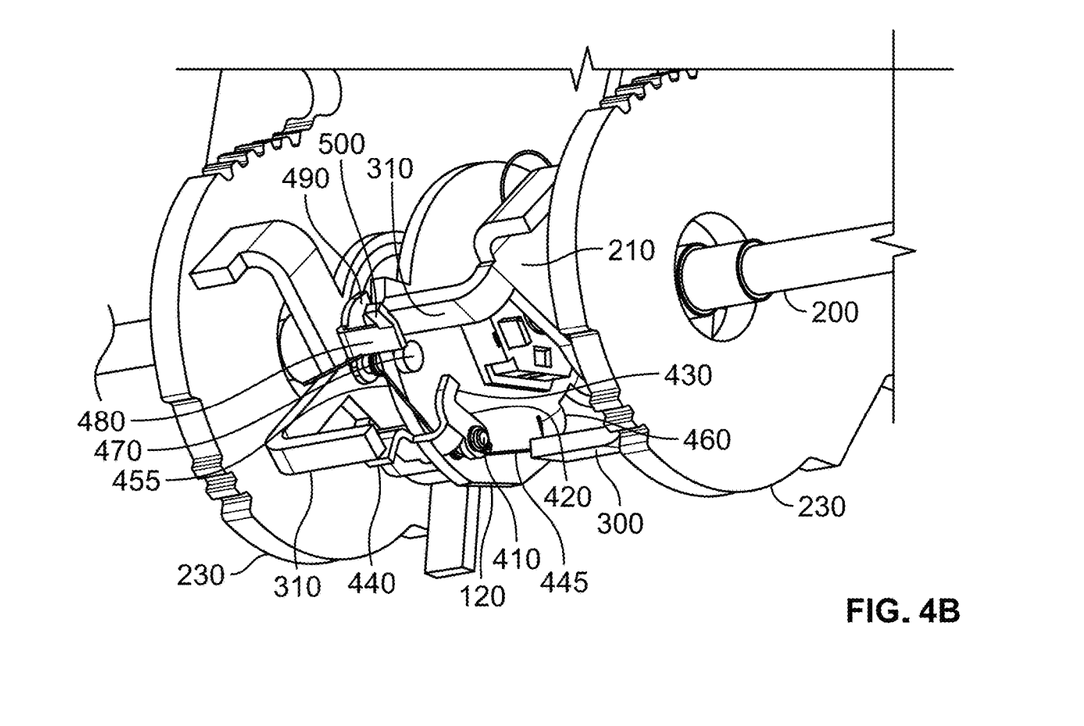

Mechanisms of embodiments of the disclosure may be configured to raise load floor 110 when either seat 100 is folded, but lower load floor 110 only when both seats 100 are unfolded. That is, mechanisms of embodiments of the disclosure may keep load floor 110 raised so long as either seat 100 to which it is coupled is folded. FIGS. 4A-4B are more detailed isometric views illustrating further details of a rotatable element of a load floor adjustment mechanism, constructed in accordance with some embodiments of the disclosure, which allows for raising of load floor 110 when either seat 100 is folded and lowering of load floor 110 only when both seats 100 are unfolded. More specifically, each extension 210 has two protrusions 300, 310 extending therefrom, to engage different circumferential locations of rotatable element 120. Rotatable element 120 also has two extensions protruding from each of its sides. In particular, extensions 400, 410 extend from one side of rotatable element 120 at different circumferential locations, while extensions 460, 470 extend from the opposite side of rotatable element 120 at differing circumferential locations from each other and differing circumferential locations from those of extensions 460, 470.

Extensions 400, 460 are positioned to engage protrusions 300, so that lowering of either seat 100 engages protrusions 300 with respective extensions 400, 460 to rotate rotatable element 120 and raise load floor 110. Extensions 400 and 460 are flanges bent to extend in opposing directions to engage differing seat extensions 210, although extensions 400, 460 need not necessarily be formed by bending. Rather, extensions 400, 460 may be any extensions of rotatable element 120, formed and shaped in any manner to engage corresponding protrusions of seat extensions 210.

Extensions 410 and 470 protrude from opposing surfaces of rotatable element 120, to support spring-loaded manipulable elements 420, 480 respectively. Extension 410 extends from the rightmost surface of rotatable element 120 in the view of FIG. 4B, to support a spring-loaded manipulable element 420 which is loaded by spring 445 to maintain an engagement 430 in position to engage protrusion 300 when protrusion 300 is rotated by raising of seat 100. This engagement rotates rotatable element 120 to lower the load floor 110 as above. However, manipulable element 420 also has an engagement 440 extending from the rightmost surface of rotatable element 120 over to the leftmost surface thereof (the surface of rotatable element 120 that is hidden in the view of FIG. 4B) to engage protrusion 310 of the opposing seat extension 210 when protrusion 310 is rotated by lowering of its seat 100. This engagement pivots manipulable element 420 about its extension 410, in turn pivoting engagement 430 out of the path of extension 300 that it would otherwise engage. In this manner, lowering of the leftmost seat 100 in the view of FIG. 4B prevents engagement of the other seat 100 with its engagement 430, thus preventing the raising of the rightmost seat 100 from lowering load floor 110. In this manner, raised load floor 110 is not lowered when only the rightmost seat 100 of FIG. 4B is raised, but is instead lowered only when both seats 100 are raised.

Similarly, extension 470 extends from the leftmost surface of rotatable element 120 in the view of FIG. 4B, to support a spring-loaded manipulable element 480 which is loaded by spring 455 to maintain an engagement 490 in position to engage protrusion 300 of extension 210 of the leftmost seat 100. The manipulable element 480 is similar in shape and function to manipulable element 420, engaging protrusion 300 of the leftmost seat 100 when the rightmost seat 100 is raised and being moved out of position to engage protrusion 300 of leftmost seat 100 via contact between engagement 500 and protrusion 310 when the rightmost seat 100 is lowered. In this manner, lowering of the rightmost seat 100 prevents engagement of the leftmost seat 100 with its engagement 490, preventing the raising of the leftmost seat 100 from lowering load floor 110. In this manner, load floor 110 is raised by engagement of extensions 400, 460 with protrusions 300 when either seat 100 is lowered, but is only lowered when both seats 100 are raised, as the lowering of either seat 100 pivots an engagement 430, 490 away from engaging its corresponding seat extension 210.

Mechanisms of embodiments of the disclosure may include any further components in addition to those described above, for providing further function. As one example, rod 200 may include one or more load limiter springs 550 provided within housings covering portions of rod 200 and coupled to each seat extension 210 or to rotatable element 120, to disengage either the seats 100 or the rotatable element 120 when excessive loads on the load floor 110 prevent the mechanism from raising the load floor 110 without causing damage thereto. In this manner, excessive loading of load floor 110 is prevented from causing damage to any part of the mechanisms of embodiments of the disclosure when users attempt to lower seats 100.

FIGS. 5A-5E are more detailed isometric views illustrating operation of a load floor adjustment mechanism, constructed in accordance with some embodiments of the disclosure. In particular, FIGS. 5A-5E sequentially illustrate the operation of mechanisms of embodiments of the disclosure when raising and lowering the load floor 110. For simplicity of illustration, operation of a single seat 100 is shown, but principles of operation apply to use of more than one seat 100 with mechanisms of embodiments of the disclosure.

Figure 5A:
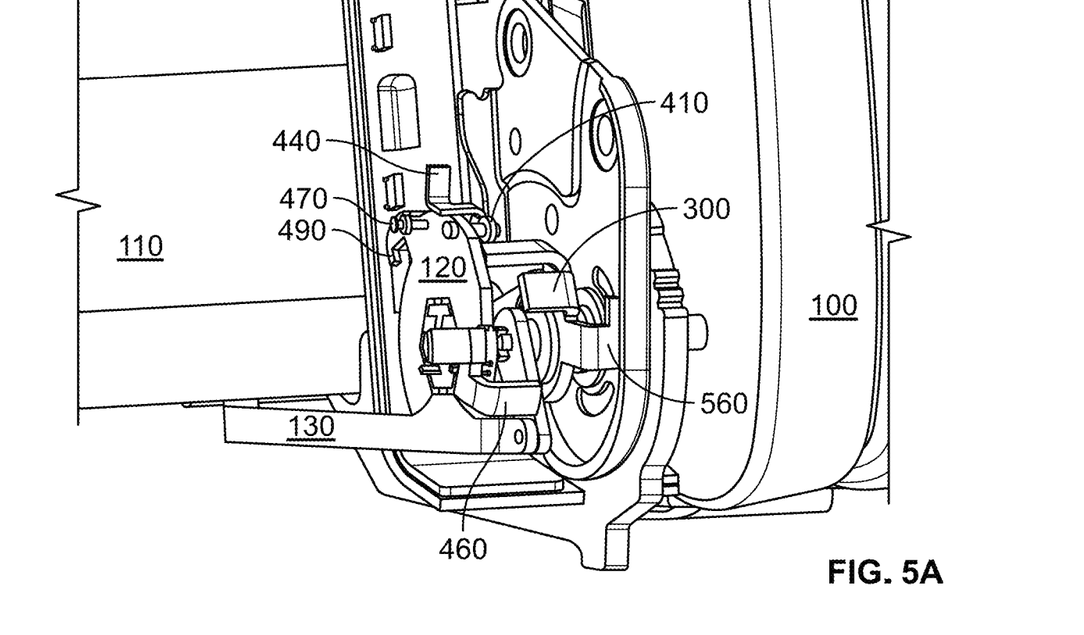
FIGS. 5A-5E are more detailed isometric views illustrating operation of a load floor adjustment mechanism, constructed in accordance with some embodiments of the disclosure.

FIG. 5A illustrates a mechanism of embodiments of the disclosure prior to raising of load floor 110. Here, protrusion 300 is coupled to upright seat 100 and has not yet been rotated to contact extension 460. Accordingly, load floor 110 is in its lowered or flat position.

Figure 5B:
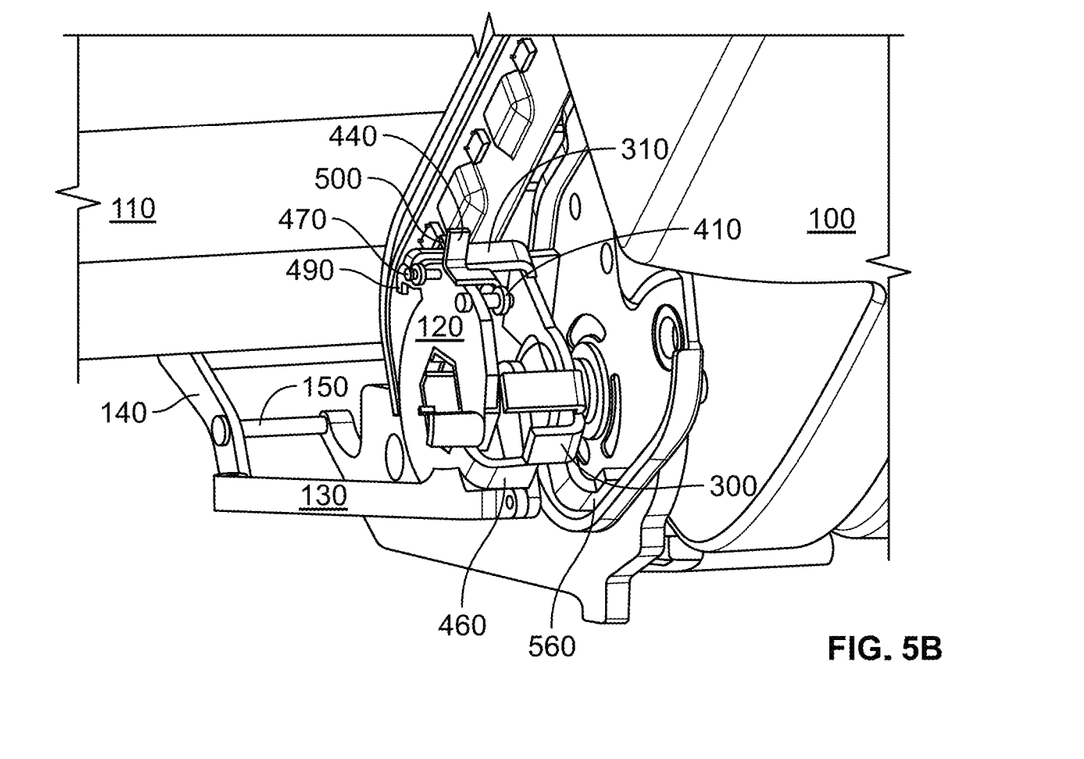

FIG. 5B illustrates operation of a mechanism of embodiments of the disclosure as the seat 100 is partially lowered from its upright configuration of FIG. 5A. Here, seat 100 is partially lowered, rotating protrusion 300 about its axis of rotation to engage extension 460. This initiates rotation of the rotatable element 120, causing the linkage 130, 140 to raise the distal end of second arm 140 to in turn begin to raise the load floor 110 via frictional contact between the load floor 110 and distal end of second arm 140. Substantially simultaneously, the protrusion 310 is rotated to contact engagement 500, pivoting end 490 out of the path of extension 300 of a seat 100 (not shown) which may face the leftmost side of rotatable element 120. Thus, lowering of rightmost seat 100 of FIG. 5B acts to both raise load floor 110 and prevent another seat 100, not shown, from lowering the load floor 110 while rightmost seat 100 is folded down.

Figure 5C:
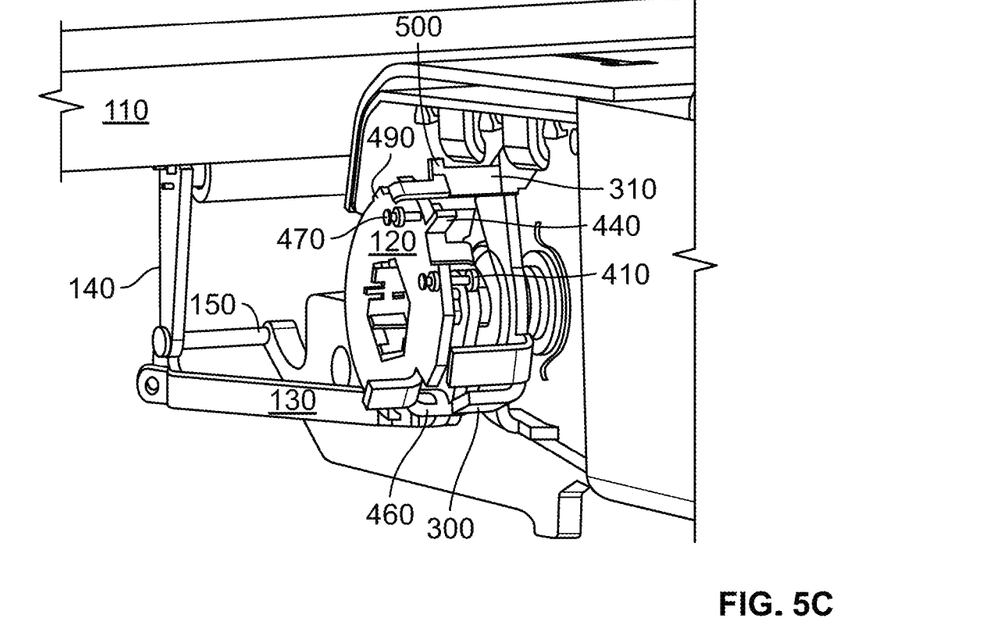

In FIG. 5C, the seat 100 continues to be lowered until it reaches its folded configuration, resting substantially horizontally and presenting its seat back as an upper surface for storage. Protrusions 300 and 310 both rotate the rotatable element 120 until second arm 140 is fully raised, thus fully raising the load floor 110 to an elevation approximately corresponding to the height of the back of seat 100. In this configuration, contact between engagement 500 and protrusion 310 is maintained, which maintains end 490 in its pivoted position and prevents rotation of another seat 100 from lowering load floor 110. Additionally, contact between protrusion 300 and extension 460 maintains second arm 140 in its upright position and thus maintains load floor 110 in its raised or inclined configuration.

Figure 5D:
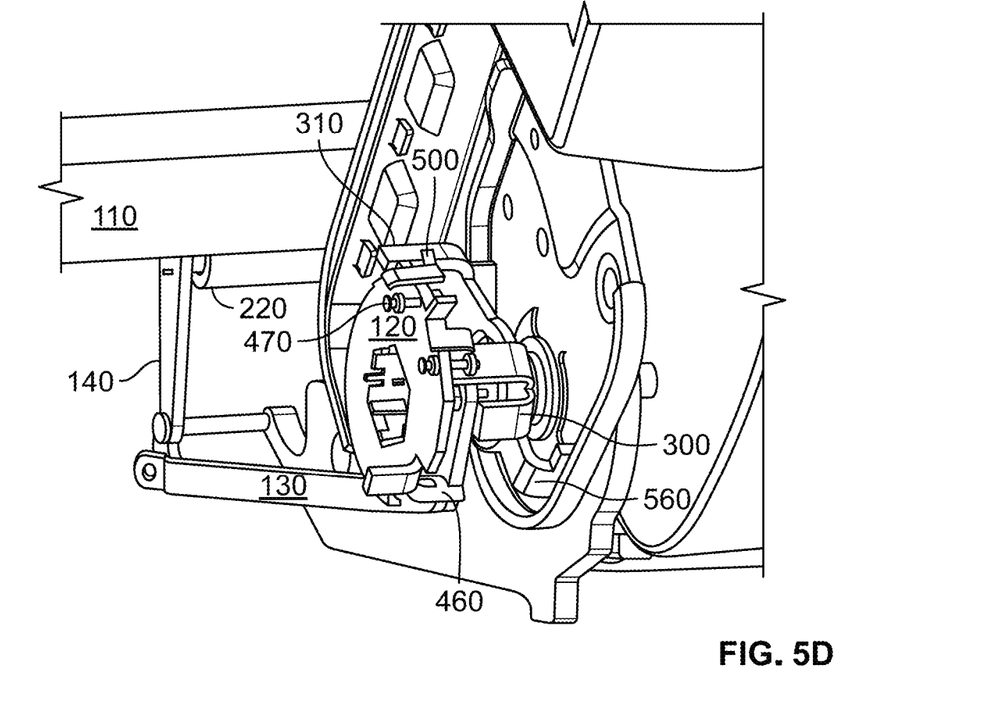

FIG. 5D illustrates operation of a mechanism of embodiments of the disclosure as the seat 100 is in the process of being raised from the lowered or folded position of FIG. 5C. In the view of FIG. 5D, seat 100 is shown as being partly but not yet fully raised, and has not yet engaged rotatable element 120 to lower the load floor 110. As the seat 100 rotates about its axis toward its raised position, protrusion 300 disengages from extension 460 and protrusion 310 also disengages from engagement 500. The rotatable element 120 remains in its position, due to the orientation of second arm 140 translating the downward load of load floor 110 into a rearward force against first arm 130. The protrusion 310 having been separated from engagement 500, end 490 is pivoted back into the path of the protrusion 300 of a leftmost seat 100 (not shown), allowing this leftmost seat 100 to engage end 490 to lower load floor 110 if desired. Thus, once rightmost seat 100 is raised, load floor 110 would remain in its raised configuration. However, subsequently also raising leftmost seat 100 would then lower load floor 110.

Figure 5E:
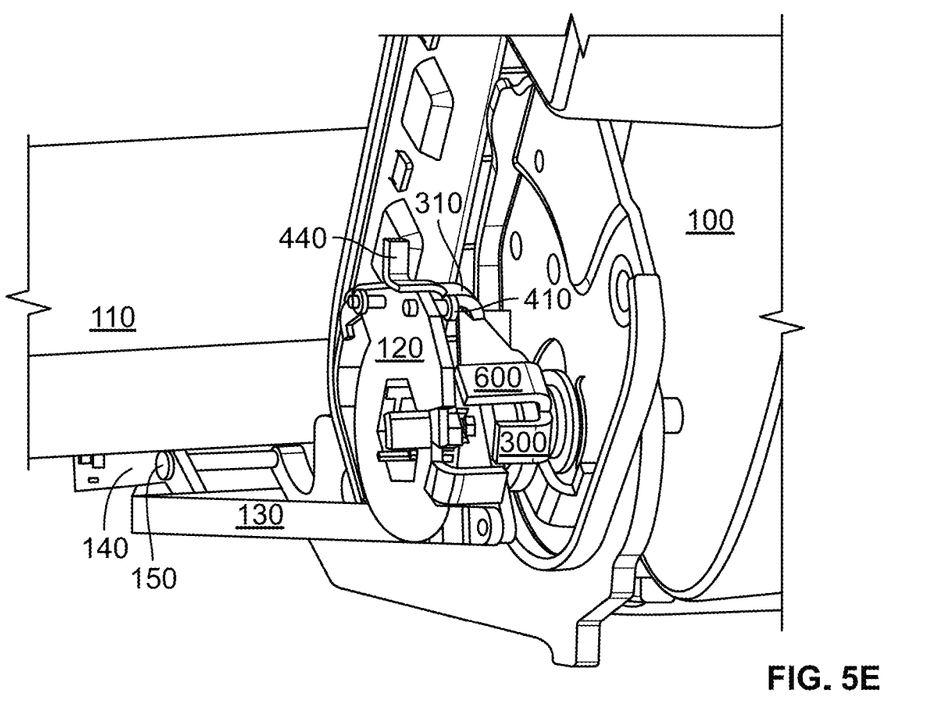

In FIG. 5E, seat 100 is raised to a point at which an extension 600 of seat extension 210 catches engagement 430 to rotate rotatable element 120 and lower the load floor 110. Here, the leftmost seat 100 has not engaged engagement 440, i.e., leftmost seat 100 is raised. Engagement 430 thus remains in place, to be contacted by extension 600. In this manner, raising of both seats 100 acts to lower load floor 110.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, mechanisms of embodiments of the disclosure may raise vehicle load floors to any elevation, whether corresponding to the upper surface of a folded seat or otherwise. Single or multiple seats may be utilized with mechanisms of embodiments of the disclosure, so as to manipulate load floor height according to motion of any one or more seats. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure. All dimensional values are approximate, and may vary.

What is claimed is:

1. An assembly for adjusting at least a portion of a load floor of a vehicle according to movement of a seat of the vehicle, the assembly comprising:

a rotatable element positioned to engage the seat of the vehicle, the rotatable element configured to be moved into a first rotational position when the seat of the vehicle is lowered, and to be moved into a second rotational position when the seat of the vehicle is raised; and a linkage coupled between the rotatable element and the portion of the load floor, the linkage configured to raise the portion of the load floor to a raised position as the rotatable element is moved into its first rotational position and to lower the portion of the load floor from the raised position to a lowered position as the rotatable element is moved from the first rotational position to the second rotational position;

wherein the rotatable element comprises a body configured to rotate about an axis, a first extension protruding away from the body in a first direction parallel to the axis, and a second extension protruding away from the body in a second direction opposite the first direction.

2. The assembly of claim 1, wherein:

the seat of the vehicle is a first seat, the vehicle further comprising a second seat; and the rotatable element is positioned to engage both the first seat and the second seat, to be configured to be moved into the first rotational position when either of the first seat or the second seat is lowered with the other of the first seat or the second seat remaining raised, and to be moved into the second rotational position only when both the first seat and the second seat are raised.

3. The assembly of claim 1, wherein the first extension protrudes from the body at a first circumferential position along the body and the second extension protrudes from the body at a second circumferential position along the body.

4. The assembly of claim 3, wherein contact between a portion of the seat of the vehicle and the first extension moves the rotatable element into its first rotational position as the seat of the vehicle is lowered, and contact between a portion of the seat of the vehicle and the second extension moves the rotatable element into its second rotational position as the seat of the vehicle is raised.

5. The assembly of claim 3, wherein:
the first extension and the second extension each protrude from a first side of the body; and
the rotatable element further comprises a third extension protruding from a second side of the body at a third circumferential position along the body, and a fourth extension protruding from the second side of the body at a fourth circumferential position along the body.

6. The assembly of claim 5, wherein:
the seat of the vehicle is a first seat facing the first side of the body, the vehicle further comprising a second seat facing the second side of the body;
the second extension comprises a first pivotable element having a first end facing the first seat and an opposing second end facing the second seat, engagement of a portion of the second seat with the second end pivoting the first end of the first pivotable element away from contact with a portion of the first seat so that raising of the first seat does not lower the portion of the load floor when the second seat is lowered; and
the fourth extension comprises a second pivotable element having a first end facing the second seat and an opposing second end facing the first seat, engagement of a portion of the first seat with the second end of the second pivotable element pivoting the first end of the second pivotable element away from contact with a portion of the second seat so that raising of the second seat does not lower the portion of the load floor when the first seat is lowered.

7. The assembly of claim 1, wherein in the raised position, at least a portion of the load floor is positioned proximate to an upper surface of the seat of the vehicle when the seat of the vehicle is lowered.

8. The assembly of claim 1, wherein in the raised position, a first end of the portion of the load floor is elevated with respect to an opposing second end of the portion of the load floor.

9. The assembly of claim 8, wherein the linkage is coupled between the rotatable element and the first end of the portion of the load floor.

10. An assembly for adjusting at least a portion of a load floor of a vehicle according to movement of a seat of the vehicle, the assembly comprising:
a rotatable element positioned to engage the seat of the vehicle, the rotatable element configured to be moved into a first rotational position when the seat of the vehicle is lowered, and to be moved into a second rotational position when the seat of the vehicle is raised; and
a linkage coupled between the rotatable element and the portion of the load floor, the linkage configured to raise the portion of the load floor to a raised position as the rotatable element is moved into its first rotational position and to lower the portion of the load floor from the raised position to a lowered position as the rotatable element is moved from the first rotational position to the second rotational position; and
a load limiter spring coupled between the rotatable element and the seat of the vehicle.

11. The assembly of claim 1, wherein the linkage comprises a first bar and a second bar, the first bar coupled between the rotatable element and the second bar, the second bar configured to pivot about a pivot point and having a first end coupled to the first bar and an opposing second end coupled to the portion of the load floor.

12. The assembly of claim 11, wherein in the raised position, the first bar and the second bar have an acute angle therebetween.

13. An assembly for adjusting at least a portion of a load floor of a vehicle according to movement of a seat of the vehicle, the assembly comprising:
a rotatable element positioned to engage the seat of the vehicle, the rotatable element configured to be moved into a first rotational position when the seat of the vehicle is lowered, and to be moved into a second rotational position when the seat of the vehicle is raised; and
a linkage coupled between the rotatable element and the portion of the load floor, the linkage configured to raise the portion of the load floor to a raised position as the rotatable element is moved into its first rotational position and to lower the portion of the load floor from the raised position to a lowered position as the rotatable element is moved from the first rotational position to the second rotational position
wherein the linkage comprises a first bar and a second bar, the first bar coupled between the rotatable element and the second bar, the second bar configured to pivot about a pivot point and having a first end coupled to the first bar and an opposing second end coupled to the portion of the load floor; and
wherein the linkage further comprises a roller coupled to the second bar and in rolling frictional contact with the portion of the load floor.

14. An assembly for adjusting at least a portion of a load floor of a vehicle according to movement of a seat of the vehicle, the assembly comprising:
a linkage coupled between the load floor of the vehicle and two seats of the vehicle, the linkage configured to raise at least a portion of the load floor to a raised position in response to lowering one of the seats of the vehicle with the other of the seats remaining in the raised position, to maintain the portion of the load floor in the raised position while at least one of the seats of the vehicle is lowered, and to lower the at least a portion of the load floor to a lowered position in response to raising of both of the seats of the vehicle; and
a rotatable element positioned to engage the two seats of the vehicle, the rotatable element coupled to the linkage so as to move the load floor between the raised position and the lowered position according to engagement by the two seats of the vehicle.

15. The assembly of claim 14, wherein the rotatable element comprises a body, a first extension protruding from the body at a first circumferential position along the body, and a second extension protruding from the body at a second circumferential position along the body.

16. The assembly of claim 15, wherein contact between a one seat of the vehicle and the first extension moves the rotatable element into a first rotational position as the one seat of the vehicle is lowered, and contact between the one seat of the vehicle and the second extension moves the rotatable element into a second rotational position as the one seat of the vehicle is raised.

17. The assembly of claim 15, wherein:
the first extension and the second extension each protrude from a first side of the body; and
the rotatable element further comprises a third extension protruding from a second side of the body at a third circumferential position along the body, and a fourth extension protruding from the second side of the body at a fourth circumferential position along the body.

18. The assembly of claim 17, wherein:
the two seats of the vehicle comprise a first seat facing the first side of the body, and a second seat facing the second side of the body;
the second extension comprises a first pivotable element having a first end facing the first seat and an opposing second end facing the second seat, engagement of a portion of the second seat with the second end pivoting the first end of the first pivotable element away from contact with a portion of the first seat so that raising of the first seat does not lower the portion of the load floor when the second seat is lowered; and
the fourth extension comprises a second pivotable element having a first end facing the second seat and an opposing second end facing the first seat, engagement of a portion of the first seat with the second end of the second pivotable element pivoting the first end of the second pivotable element away from contact with a portion of the second seat so that raising of the second seat does not lower the portion of the load floor when the first seat is lowered.

19. The assembly of claim 14, wherein in the raised position, at least a portion of the load floor is positioned proximate to an upper surface of one seat of the vehicle when the one seat of the vehicle is lowered.

20. The assembly of claim 14, wherein the rotatable element comprises a body configured to rotate about an axis, a first extension protruding away from the body in a first direction parallel to the axis, and a second extension protruding away from the body in a second direction opposite the first direction.

* * * * *